US010599328B2

(12) United States Patent
Ellsworth et al.

(10) Patent No.: US 10,599,328 B2
(45) Date of Patent: Mar. 24, 2020

(54) VARIABLE USER TACTILE INPUT DEVICE WITH DISPLAY FEEDBACK SYSTEM

(71) Applicant: VALVE CORPORATION, Bellevue, WA (US)

(72) Inventors: Jeri Janet Ellsworth, Kirkland, WA (US); Joseph Leroy Ludwig, Kirkland, WA (US)

(73) Assignee: Valve Corporation, Bellevue, WA (US)

( * ) Notice: Subject to any disclaimer, the term of this patent is extended or adjusted under 35 U.S.C. 154(b) by 756 days.

(21) Appl. No.: 13/831,013

(22) Filed: Mar. 14, 2013

(65) Prior Publication Data
US 2014/0267046 A1  Sep. 18, 2014

(51) Int. Cl.
G09G 5/00 (2006.01)
G06F 3/0488 (2013.01)

(52) U.S. Cl.
CPC .............. G06F 3/04886 (2013.01)

(58) Field of Classification Search
USPC ......................................... 345/168
See application file for complete search history.

(56) References Cited

U.S. PATENT DOCUMENTS

| 4,454,592 A | 6/1984 | Cason et al. | |
| 6,611,253 B1 * | 8/2003 | Cohen | G06F 3/0418 345/168 |
| 2010/0201648 A1 | 8/2010 | Chen | |
| 2010/0259561 A1 | 10/2010 | Forutanpour et al. | |
| 2010/0277505 A1 * | 11/2010 | Ludden et al. | 345/634 |
| 2010/0328219 A1 * | 12/2010 | Lombardi et al. | 345/169 |
| 2011/0261058 A1 | 10/2011 | Luo | |
| 2012/0113008 A1 | 5/2012 | Makinen et al. | |
| 2012/0235912 A1 * | 9/2012 | Laubach | G06F 3/04895 345/163 |
| 2013/0257748 A1 * | 10/2013 | Ambrus et al. | 345/173 |

FOREIGN PATENT DOCUMENTS

WO  WO 2012144666 A1 * 10/2012

OTHER PUBLICATIONS

PCT International Search Report dated Sep. 4, 2014 of International Application No. PCT/US14/22195. 13 Pages.

* cited by examiner

Primary Examiner — Adam R. Giesy
(74) Attorney, Agent, or Firm — Lee & Hayes, P.C.

(57) ABSTRACT

Methods and systems are disclosed relating to variable user tactile input device with display feedback to guide the user to the keys that the user may want to depress. The display feedback may highlight the keys that are being hovered over but not yet selected for writing to the application window so that the user may ensure that the correct keys are selected to be written to the application window. The variable user tactile input device with display feedback may be a keyboard system with tactile feedback and a virtual keyboard display system that may provide a view of the user tactile input device to the user while using a heads up display (HUD). The invention may provide a user with an input system that may be programmable to be a virtual pad such as a virtual keyboard, a virtual game controller, a virtual number pad and any other user tactile input device that the user may intend to use.

28 Claims, 12 Drawing Sheets

VARIABLE USER TACTILE INPUT DEVICE WITH DISPLAY FEEDBACK SYSTEM

BACKGROUND OF THE DISCLOSURE

1. Field of the Disclosure

The disclosure relates generally to methods and systems for a variable user tactile input device with display feedback. The variable user tactile input device with display feedback may be a keyboard system with tactile feedback and a software generated keyboard display system. The invention may provide a user tactile input device to the user that may not be viewed while using a heads up display (HUD) and, more specifically according to aspects of certain embodiments, may provide a user with an input device that may be programmable to be a keyboard, a joystick, a number pad, a game pad and any other user tactile input device that the user may want to use.

2. General Background

Historically electronic devices such as computers, tablets, gaming boxes may use a user tactile input device, for example, a keyboard, a joystick, a number pad, a game pad, that may be mechanical or electrical in nature. As computers, tablets, gaming boxes, for example, may be becoming smaller, mechanical user tactile input devices may become difficult to provide and use. For example, it may not be possible to make a standard QWERTY keyboard as shown in the system of FIG. 2A small enough to fit on a device that may need a keyboard entry such as a cell phone or a tablet computer. If the keyboard is made small enough to use in many prior art devices, such as a cellular phone or a tablet computer, may be awkward to use since the keyboard buttons may be smaller than the users fingers. The advantage of using a standard QWERTY keyboard may be that the user may have familiarity with this type of user entry device and it may be manufactured to have tactile feedback. Tactile feedback is the response that the user obtains when depressing a key. Tactile feedback may be electrical or mechanical in nature and, for example, may be a clicking sound, a motion of the keys, or a vibration when a key is depressed.

FIG. 2B depicts prior art that may use a standard QWERTY keyboard 130 as its user tactile input device. Such a keyboard may use mechanical switches on every key depress and may be shown to be connected to a computer 140 while the computer may be shown to be connected to a display 150. Certain user tactile input systems may be limited because the user can only view where to type on the keyboard 130 when the user can view the physical keyboard. There may be no alignment fixtures or contact bumps on the keys to align the users fingers to the keys and there may be no feedback mechanisms from the display 150 that the user may be able to view before a key is depressed. For these reasons, for applications where the user may not be able to see the keyboard, the user may not know if they are going to be typing the correct keys on the keyboard until after the key has been depressed and it shows up on the display in the Prompt Line 170 within the application window 160. The prompt line 170 represents any area within the computer display where typed text may appear. The keyboard 130 connection 135 to the computer 140 in FIG. 2B may be wired or wirelessly connected, including without limitation WiFi, RF or Bluetooth.

Another approach, for example, for a tablet or for a cellular phone, may be to have a touch screen and virtual user tactile input device on the display of the device. The issue with this approach may be that as soon as the display keys may be touched by the user, for example, with a finger or with a pointing stylus, the symbols corresponding to the keys are displayed on the display. Simply resting the users fingers on the display may depress a key and cause a symbol to appear in the prompt line. Therefore, the user may need to view the display before touching a key. For certain applications the user may not be able to see the user tactile input device, such as a user using a heads up display (HUD) while typing on a virtual keyboard. In such applications, the user may find that the keys that have been pressed may be incorrect after the symbols are displayed on the prompt line of the application window.

FIG. 3 depicts prior art that may use a QWERTY keyboard as its user tactile input device using a touch screen QWERTY display keyboard 330. The display keyboard shows a QWERTY keyboard 330 and when a key is touched 335, for example, with a finger or with a pointing stylus 345, the keys are displayed on the display 310 on the prompt line 340 of the application window 320. This keyboard may need to be viewed before being touched in order for the correct symbol to be appear in the prompt line 340, since simply touching any key will type that key. This also requires that the user must be able to access the keyboard and view the keyboard at the same time. This may not work for a heads up display that is approximately one inch from the eye.

Another prior art implementation may be an optical virtual keyboard. The optical virtual keyboard may optically detect and analyze human hands and finger motions and may interpret them as operations on a physically non-existent input device such as a surface having painted keys. In this way it may allow the emulation of many types of manually operated input devices such as a mouse, game pad, or keyboard. A mechanical input unit may be replaced by such a virtual device, but it may require that the fingers move in a typing fashion in front of an optical detector. Therefore, it may need an optical detector in close proximity to the hands, monitoring hand movement and any movement of the hands and fingers may type keys on the display.

Accordingly, it is desirable to address the limitations in the art. For example, there exists a need to provide for systems and methods that may allow the user to use a variable user tactile input device that may not be able to be viewed at the same time as the display and may provide tactile and/or visual feedback to the user before the key may be depressed.

BRIEF DESCRIPTION OF THE DRAWINGS

By way of example, reference will now be made to the accompanying drawings, which are not to scale.

DETAILED DESCRIPTION

Figure 1A:
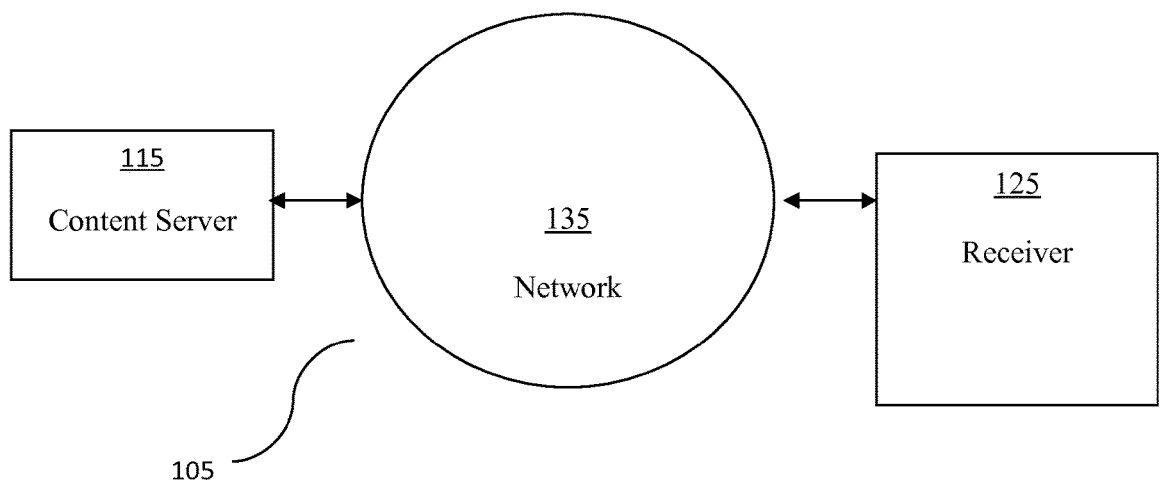
FIG. 1A illustrates an exemplary networked environment and its relevant components according to certain embodiments of the present invention

Those of ordinary skill in the art will realize that the following description of the present invention is illustrative only and not in any way limiting. Other embodiments of the invention will readily suggest themselves to such skilled persons, having the benefit of this disclosure. Reference will now be made in detail to specific implementations of the present invention as illustrated in the accompanying drawings. The same reference numbers will be used throughout the drawings and the following description to refer to the same or like parts.

In certain embodiments, a variable user tactile input device is disclosed with display feedback to guide the user to the keys that the user may want to depress. The variable user tactile input device with display feedback may be a keyboard system with tactile feedback and a virtual keyboard display system that may provide a view of the user tactile input device to the user while using a heads up display (HUD). The invention may provide a user with an input system that may be programmable to be a virtual keyboard, a virtual game controller, a virtual number pad and any other user tactile input device that the user may intend to use. Other aspects and advantages of various aspects of the present invention may be seen upon review of the figures and of the detailed description that follows.

Certain embodiments include an input device with display feedback to guide a user to keys that the user may want to select. The input device may include a display comprising a virtual pad overlaid on the display, and at least one user input entry point coupled to the display for highlighting a key on the virtual pad when one of the at least one user input entry point is hovered over by a pointer.

Certain embodiments include a method of providing display feedback for an input device to guide a user to keys that the user may want to select. The method may include providing a display comprising a virtual pad overlaid on the display, hovering over at least one user input entry point, and highlighting a key on the virtual pad. In certain embodiments, the method further comprises depressing a user entry point, and displaying a symbol in an application window prompt line on the display.

In certain embodiments, the display further comprises an application window prompt line, such that a symbol is displayed in the application window prompt line when a user input entry point is depressed by said pointer. In certain embodiments, the at least one user input entry point is a bump contact that is raised from a surface. In certain embodiments, the at least one user input entry point is flat with a surface. In certain embodiments, the at least one user input entry point comprises at least one row and one column of user input entry points.

In certain embodiments, the virtual pad is semi-transparent. In certain embodiments, the virtual pad comprises at least one virtual key that is mapped one-to-one to the at least one user input entry point. In certain embodiments, the virtual pad is a virtual keyboard. In certain embodiments, the virtual pad is a virtual game controller. In certain embodiments, the virtual pad is a virtual number pad. In certain embodiments, the virtual pad remains on the display for at least one second after the pointer is removed from said user input entry point.

Certain embodiments provide an input device with display feedback to guide a user to keys that the user may want to select. The input device may comprise a keyboard hover capacitance circuit monitor for detecting when a pointer hovers over a user input entry point, a virtual pad monitor displayer for generating a virtual pad on a display, a key monitor highlighter for highlighting a symbol on the virtual pad in response to the pointer hovering over the user input entry point, a switch depress monitor for detecting when a user entry point is depressed by a pointer, a switch to key stroke converter coupled to the switch depress monitor for translating the depressed user entry point to a corresponding symbol, and a key stroke writer coupled to the switch to key stroke converter for writing the corresponding symbol to a prompt line of an application window on the display.

Certain embodiments include a method for providing display feedback to an input device to guide a user to keys that the user may want to select. The method may include detecting when a pointer hovers over a user input entry point, generating a virtual pad on a display, highlighting a symbol on the virtual pad in response to the pointer hovering over the user input entry point, detecting when a user entry point is depressed by a pointer, translating the depressed user entry point to a corresponding symbol, and writing the corresponding symbol to a prompt line of an application window on the display.

Further, certain figures in this specification are flow charts illustrating methods and systems. It will be understood that each block of these flow charts, and combinations of blocks in these flow charts, may be implemented by computer program instructions. These computer program instructions may be loaded onto a computer or other programmable apparatus to produce a machine, such that the instructions which execute on the computer or other programmable apparatus create structures for implementing the functions specified in the flow chart block or blocks. These computer program instructions may also be stored in a computer-readable memory that can direct a computer or other programmable apparatus to function in a particular manner, such that the instructions stored in the computer-readable memory produce an article of manufacture including instruction structures which implement the function specified in the flow chart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flow chart block or blocks.

Accordingly, blocks of the flow charts support combinations of structures for performing the specified functions and combinations of steps for performing the specified functions. It will also be understood that each block of the flow charts, and combinations of blocks in the flow charts, can be implemented by special purpose hardware-based computer systems which perform the specified functions or steps, or combinations of special purpose hardware and computer instructions.

For example, any number of computer programming languages, such as C, C++, C# (CSharp), Perl, Ada, Python, Pascal, SmallTalk, FORTRAN, assembly language, and the like, may be used to implement aspects of the present invention. Further, various programming approaches such as procedural, object-oriented or artificial intelligence techniques may be employed, depending on the requirements of each particular implementation. Compiler programs and/or virtual machine programs executed by computer systems generally translate higher level programming languages to generate sets of machine instructions that may be executed by one or more processors to perform a programmed function or set of functions.

The term "machine-readable medium" should be understood to include any structure that participates in providing data which may be read by an element of a computer system. Such a medium may take many forms, including but not limited to, non-volatile media, volatile media, and transmission media. Non-volatile media include, for example, optical or magnetic disks and other persistent memory. Volatile media include dynamic random access memory (DRAM) and/or static random access memory (SRAM). Transmission media include cables, wires, and fibers, including the wires that comprise a system bus coupled to processor. Common forms of machine-readable media include, for example, a floppy disk, a flexible disk, a hard disk, a magnetic tape, any other magnetic medium, a CD-ROM, a DVD, any other optical medium.

FIG. 1A depicts an exemplary networked environment 105 in which systems and methods, consistent with exemplary embodiments, may be implemented. As illustrated, networked environment 105 may include a content server 115, a receiver 125, and a network 135. The exemplary simplified number of content servers 115, receivers 125, and networks 135 illustrated in FIG. 1A can be modified as appropriate in a particular implementation. In practice, there may be additional content servers 115, receivers 125, and/or networks 135.

In certain embodiments, a receiver 125 may include any suitable form of multimedia playback device, including, without limitation, a cable or satellite television set-top box, a DVD player, a digital video recorder (DVR), or a digital audio/video stream receiver, decoder, and player. A receiver 125 may connect to network 135 via wired and/or wireless connections, and thereby communicate or become coupled with content server 115, either directly or indirectly. Alternatively, receiver 125 may be associated with content server 115 through any suitable tangible computer-readable media or data storage device (such as a disk drive, CD-ROM, DVD, or the like), data stream, file, or communication channel.

Network 135 may include one or more networks of any type, including a Public Land Mobile Network (PLMN), a telephone network (e.g., a Public Switched Telephone Network (PSTN) and/or a wireless network), a local area network (LAN), a metropolitan area network (MAN), a wide area network (WAN), an Internet Protocol Multimedia Subsystem (IMS) network, a private network, the Internet, an intranet, and/or another type of suitable network, depending on the requirements of each particular implementation.

One or more components of networked environment 105 may perform one or more of the tasks described as being performed by one or more other components of networked environment 105.

Figure 1B:
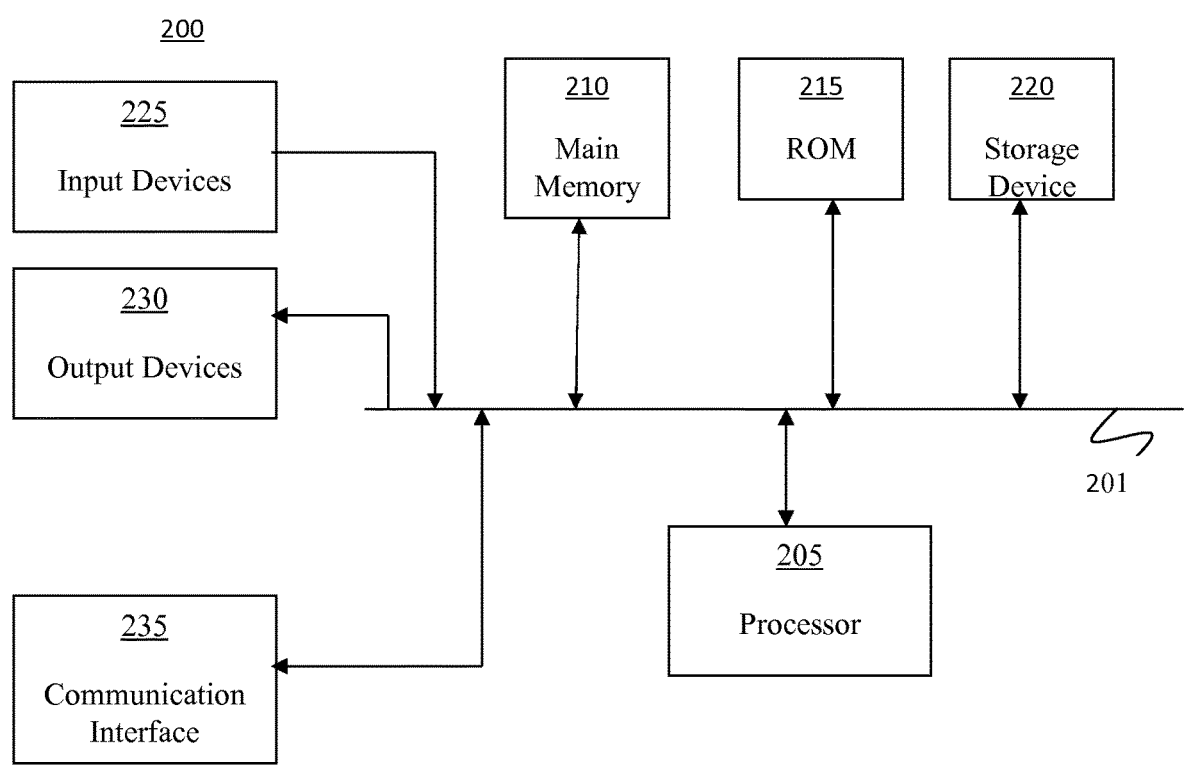
FIG. 1B is an exemplary block diagram of a computing device that may be used to implement certain embodiments of the present invention
Figure 2A:
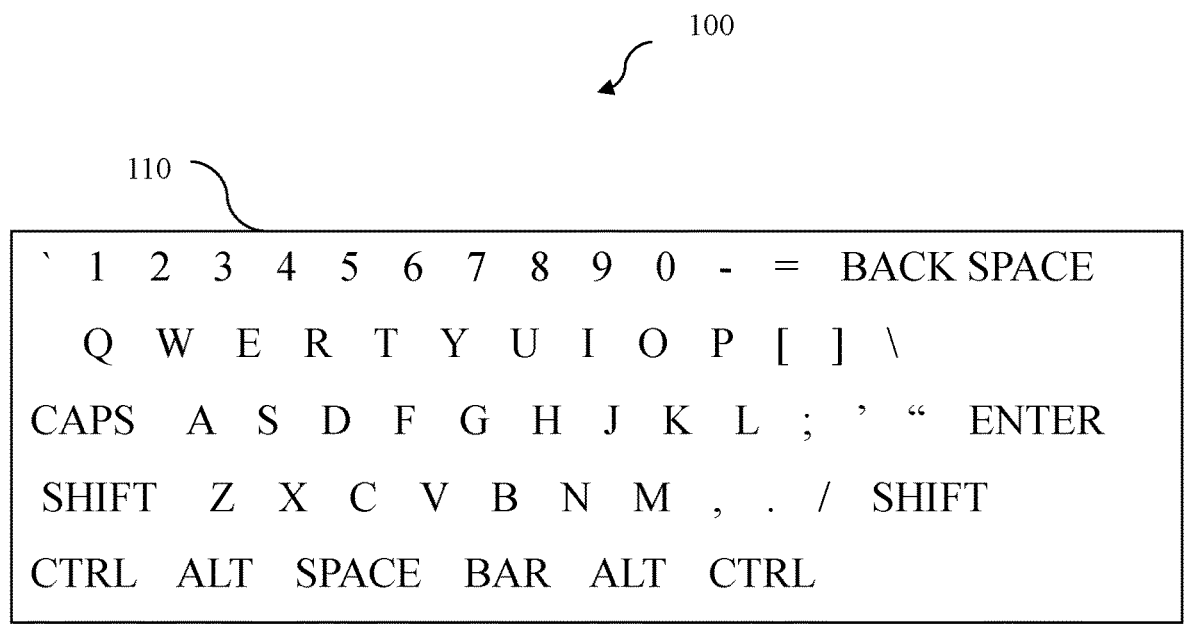
FIG. 2A depicts a standard QWERTY keyboard that is typically used to enter data into a computer or similar device
Figure 2B:
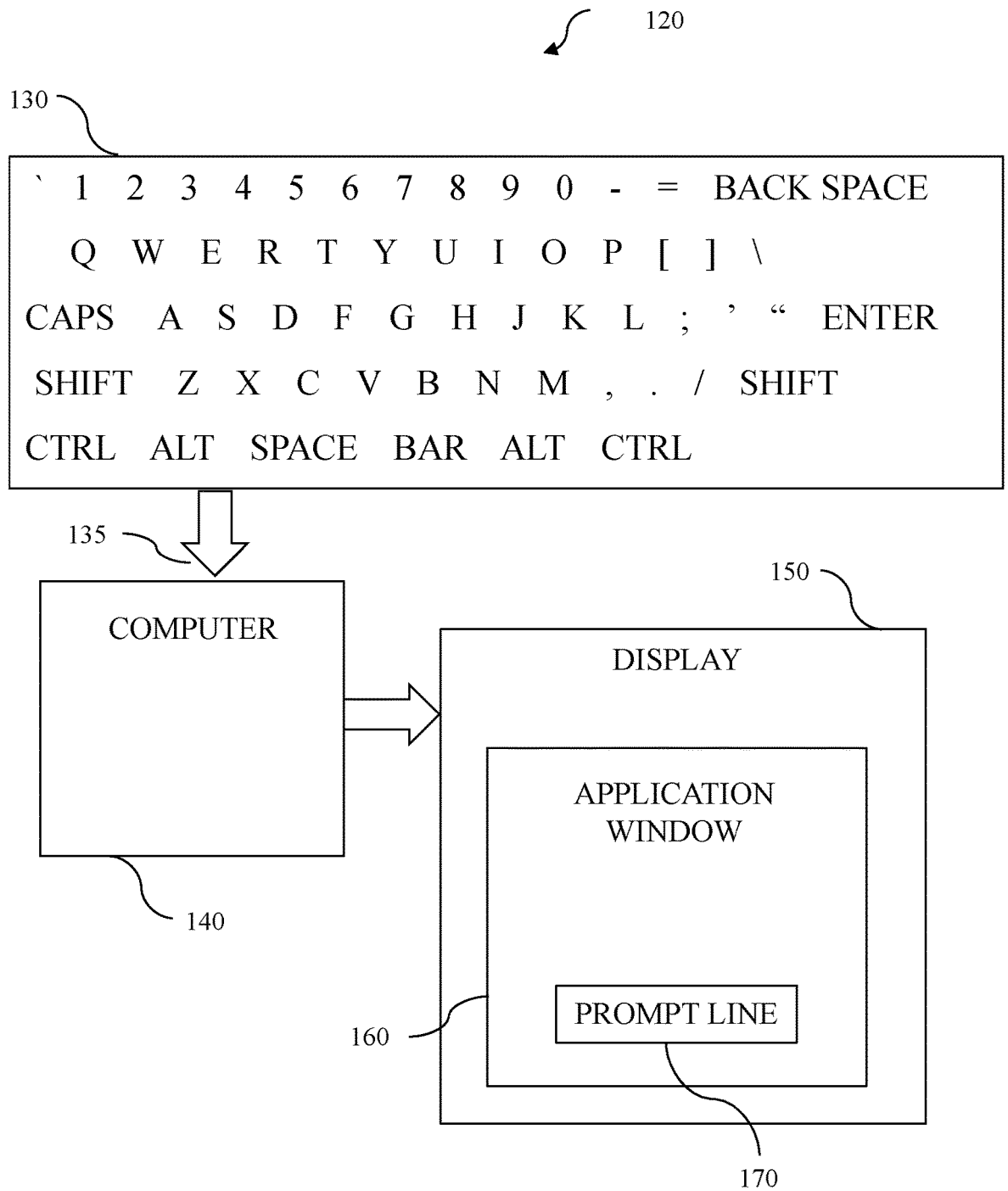
FIG. 2B depicts a block diagram of the prior art having a mechanical keyboard attached to a computer and display system
Figure 3:
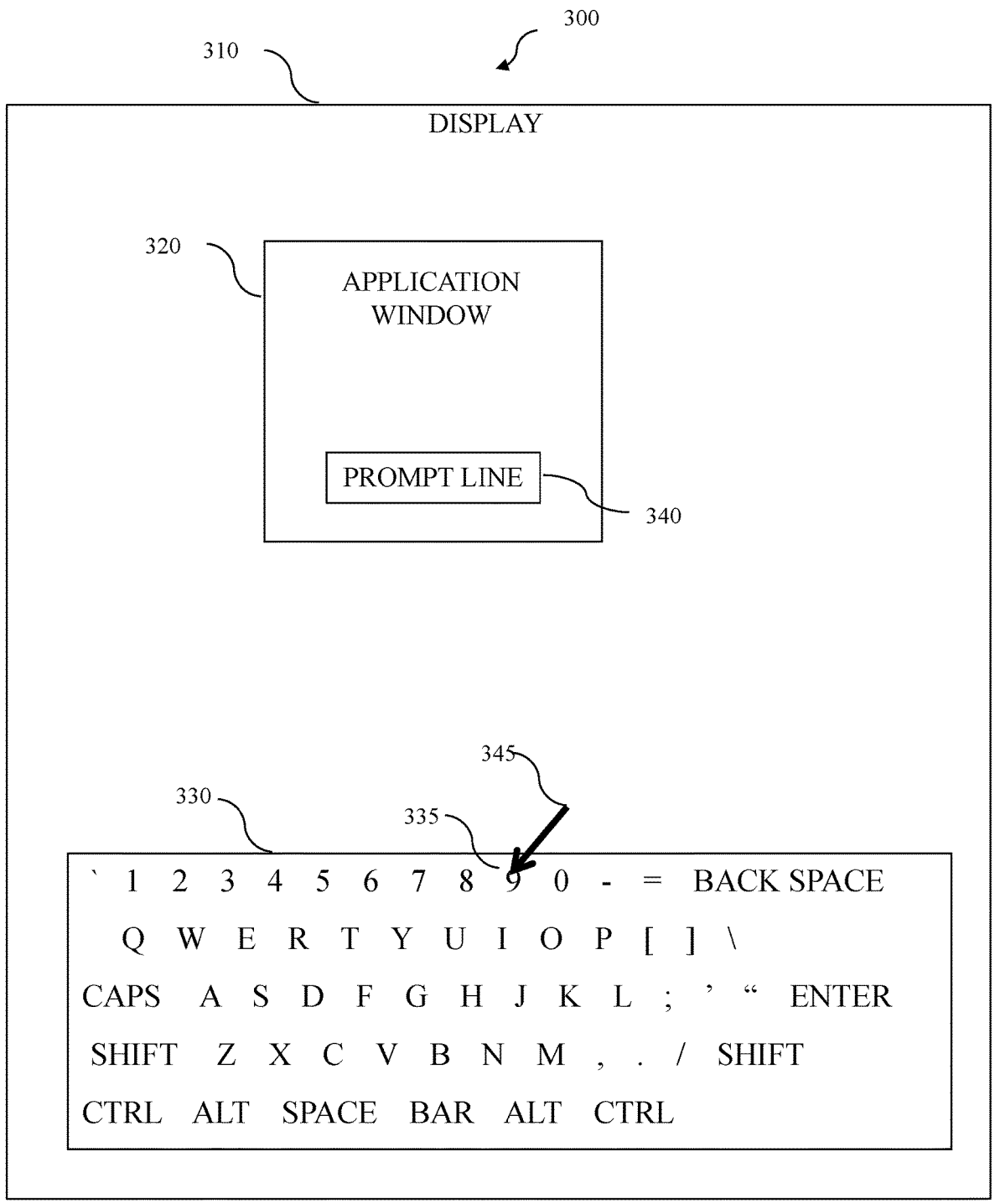
FIG. 3 depicts a block diagram of the prior art having a virtual keyboard that may be displayed on the display monitor of the computer or equivalent device

FIG. 1B is an exemplary diagram of a computing device 200 that may be used to implement aspects of certain embodiments of the present invention, such as aspects of content server 115 or of receiver 125. Computing device 200 may include a bus 201, one or more processors 205, a main memory 210, a read-only memory (ROM) 215, a storage device 220, one or more input devices 225, one or more output devices 230, and a communication interface 235. Bus 201 may include one or more conductors that permit communication among the components of computing device 200.

Processor 205 may include any type of conventional processor, microprocessor, or processing logic that interprets and executes instructions. Main memory 210 may include a random-access memory (RAM) or another type of dynamic storage device that stores information and instructions for execution by processor 205. ROM 215 may include a conventional ROM device or another type of static storage device that stores static information and instructions for use by processor 205. Storage device 220 may include a magnetic and/or optical recording medium and its corresponding drive.

Input device(s) 225 may include one or more conventional mechanisms that permit a user to input information to computing device 200, such as a keyboard, a mouse, a pen, a stylus, handwriting recognition, voice recognition, biometric mechanisms, and the like. Output device(s) 230 may include one or more conventional mechanisms that output information to the user, including a display, a projector, an A/V receiver, a printer, a speaker, and the like. Communication interface 235 may include any transceiver-like mechanism that enables computing device/server 200 to communicate with other devices and/or systems. For example, communication interface 235 may include mechanisms for communicating with another device or system via a network, such as network 135 as shown in FIG. 1A.

As will be described in detail below, computing device 200 may perform operations based on software instructions that may be read into memory 210 from another computer-readable medium, such as data storage device 220, or from another device via communication interface 235. The software instructions contained in memory 210 cause processor 205 to perform processes that will be described later. Alternatively, hardwired circuitry may be used in place of or in combination with software instructions to implement processes consistent with the present invention. Thus, various implementations are not limited to any specific combination of hardware circuitry and software.

A web browser comprising a web browser user interface may be used to display information (such as textual and graphical information) on the computing device 200. The web browser may comprise any type of visual display capable of displaying information received via the network 135 shown in FIG. 1A, such as Microsoft's Internet Explorer browser, Netscape's Navigator browser, Mozilla's Firefox browser, PalmSource's Web Browser, Google's Chrome browser or any other commercially available or customized browsing or other application software capable of communicating with network 135. The computing device 200 may also include a browser assistant. The browser assistant may include a plug-in, an applet, a dynamic link library (DLL), or a similar executable object or process. Further, the browser assistant may be a toolbar, software button, or menu that provides an extension to the web browser. Alternatively, the browser assistant may be a part of the web browser, in which case the browser would implement the functionality of the browser assistant.

The browser and/or the browser assistant may act as an intermediary between the user and the computing device 200 and/or the network 135. For example, source data or other information received from devices connected to the network 135 may be output via the browser. Also, both the browser and the browser assistant are capable of performing operations on the received source information prior to outputting the source information. Further, the browser and/or the browser assistant may receive user input and transmit the inputted data to devices connected to network 135.

Similarly, certain embodiments of the present invention described herein are discussed in the context of the global data communication network commonly referred to as the Internet. Those skilled in the art will realize that embodiments of the present invention may use any other suitable data communication network, including without limitation direct point-to-point data communication systems, dial-up networks, personal or corporate Intranets, proprietary networks, or combinations of any of these with or without connections to the Internet.

Figure 4:
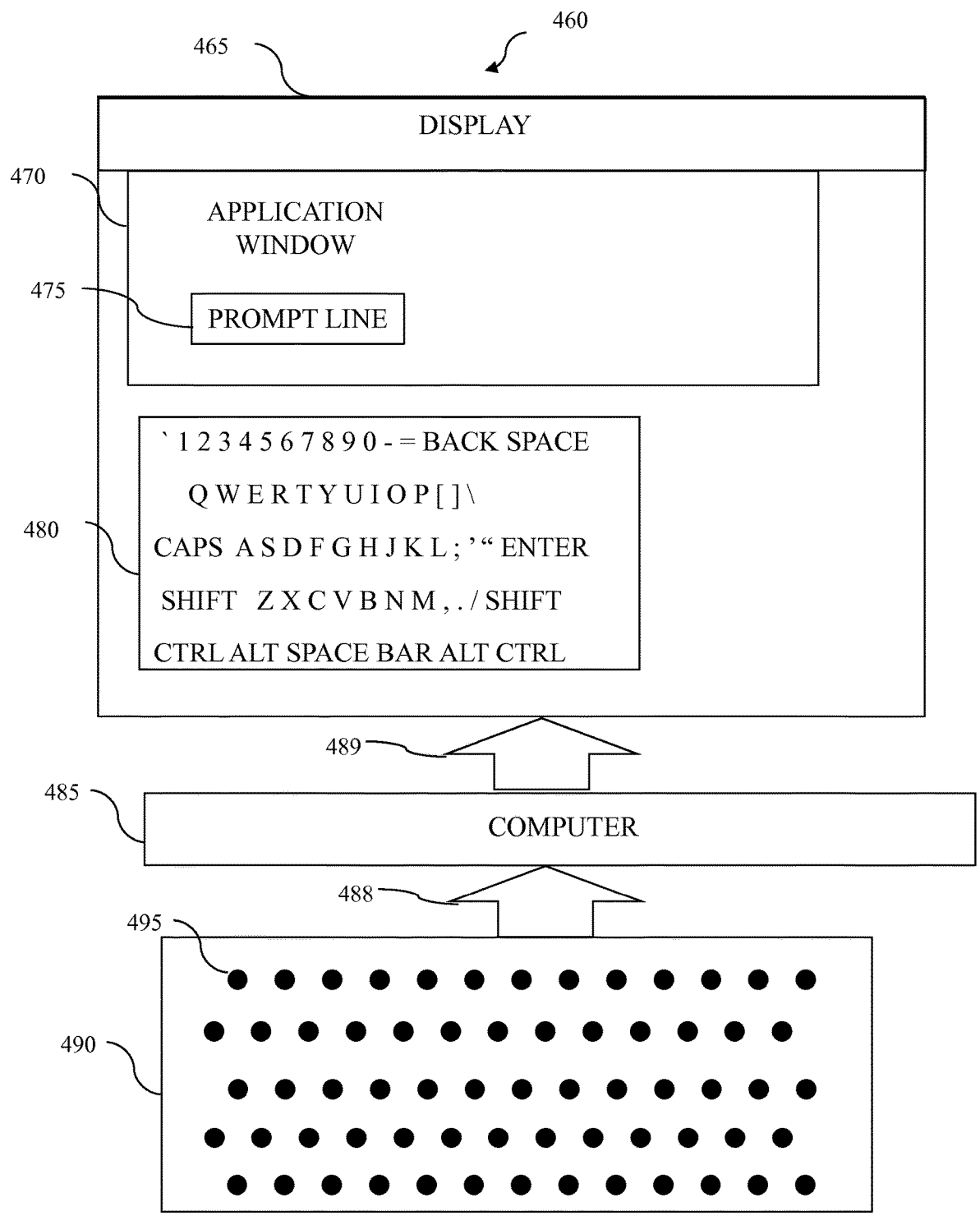
FIG. 4 depicts a block diagram of certain embodiments of the invention encompassing a user tactile input device connected to a computer which is connected to a display where the user tactile input device keys may be displayed on the display monitor

FIG. 4 depicts an embodiment of an input system 460 comprising a variable user tactile input device 490 with display feedback using a virtual pad such as a virtual keyboard, virtual game controller or virtual number pad, to guide the user on which user input entry points the user may want to depress before they are depressed. The five rows of user input entry points 495 may be designed onto a surface, for example, a printed circuit card (PCB), ribbon cable or electrical substrate. Each user input entry point 495 may consist of a contact bump, a capacitive sensor and a switch, such as mechanical switch or an electrical switch. The user input entry point 495 may be raised to form a contact bump on the surface to guide the pointing device such as a finger or a stylus. The user input entry points 495 may all have contact bumps or may all be level contacts with the surface such as not to have a contact bump. The user entry points 495 may also have a combination of raised contact bumps and level contacts with the surface. There may be any number of rows and columns of user input entry points 495, for example, a one by one matrix to a "n" by "y" matrix where n and y are any integer greater than or equal to 1. The user tactile input device 490 may be coupled to a computer 485 through an interface 488. The interface 488 may be a wired interface or a wireless interface. The wired interface, for example, may be a serial interface or a parallel interface. The wireless interface, for example may be WiFi, RF, Bluetooth or other wireless type of interface. The computer 485 may be coupled to a display 465 through an interface 489. The display interface 489 for example, may be a High Definition Multimedia Interface (HDMI), Unified Display Interface (UDI), Flexible Display Interface (FDI), Video Graphics Array (VGA), Digital Visual Interface (DVI) or Display Port. The display 465 may have one or more application windows 470 running at any time with one or more text entry windows such as a prompt line 475. If a pointing device is hovered over one of the user input entry points 495 a semi-transparent representation called a virtual pad such as a virtual keyboard, virtual game controller, virtual number pad, of the user tactile input device 480 may be overlaid on the display monitor 465. In the embodiment depicted, a QWERTY keyboard 480 is shown within the display monitor 465. The representation of the user tactile input device 480 may be overlaid on any running application 470, set of applications, or anywhere on the display monitor 465. If the pointing device is no longer hovered over one of the user input entry points 495 the representation of the user tactile input device 480 may disappear from the display monitor 465. The representation of the user tactile input device 480 may disappear after a programmed time of inactivity or hovering of the pointer over user tactile input.

Figure 5:
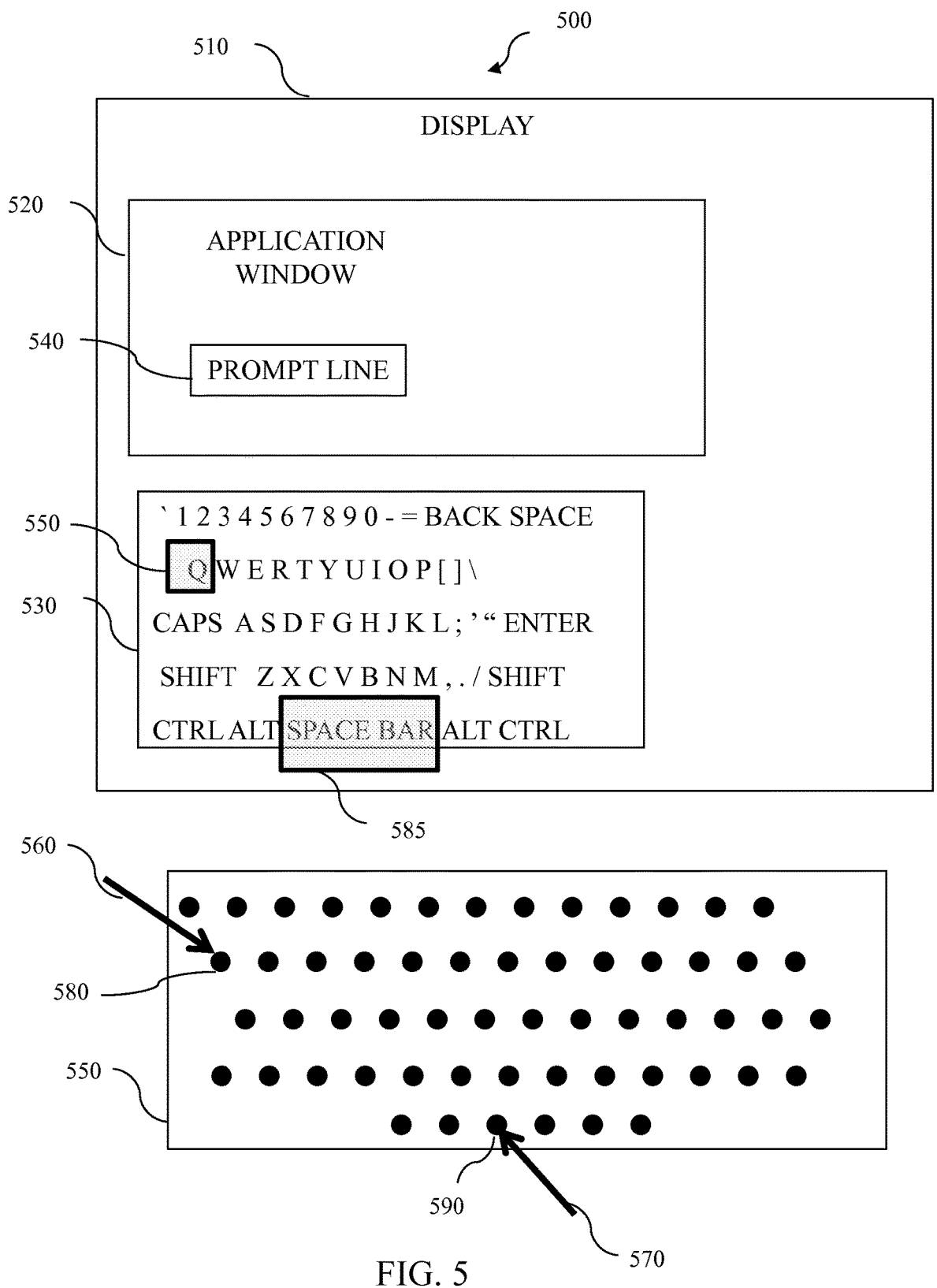
FIG. 5 depicts a block diagram of certain embodiments of the invention encompassing a user tactile input device with a pointer hovering over different user input entry points.

FIG. 5 depicts a block diagram of certain embodiments of the invention encompassing a user tactile input device 550 with pointing devices 560 and 570 hovering over different user input entry points 580 and 590. Hovering the pointing device 560 over the user input entry point 580 may highlight a key on the virtual keyboard such as Q 550 on the virtual keyboard 530. Hovering another pointing device 570 over the user input entry point 590 may highlight a key on the virtual keyboard such as SPACE BAR 585. Hovering may be any contact with the user tactile input device 550 with a pointing device 560 such as a finger or a stylus. In certain embodiments, hovering may include placing a pointing device 560 such as a finger or a stylus in proximity to but not in actual contact with user tactile input device 550 and sensing the proximity of pointing device 560. Multiple pointers may be used such as multiple fingers to hover over multiple user input entry points. If this occurs, then multiple keys on the virtual keyboard may be highlighted at the same time. If a user input entry point is depressed by a pointing device, the particular corresponding symbol to the user input entry point may be displayed in the particular prompt line 540 in the application window 520. For example, the user input entry point 580 may be depressed by a pointing device 560. This may cause the letter Q 550 to appear in the prompt line 540. It may also be possible to depress multiple keys for multiple key combinations at the same time such as SHIFT A to produce the capital letter A. Therefore, it is understood that the invention is not to be limited to the specific embodiments disclosed, and that modifications and embodiments are intended to be included as readily appreciated by those skilled in the art.

Figure 6:
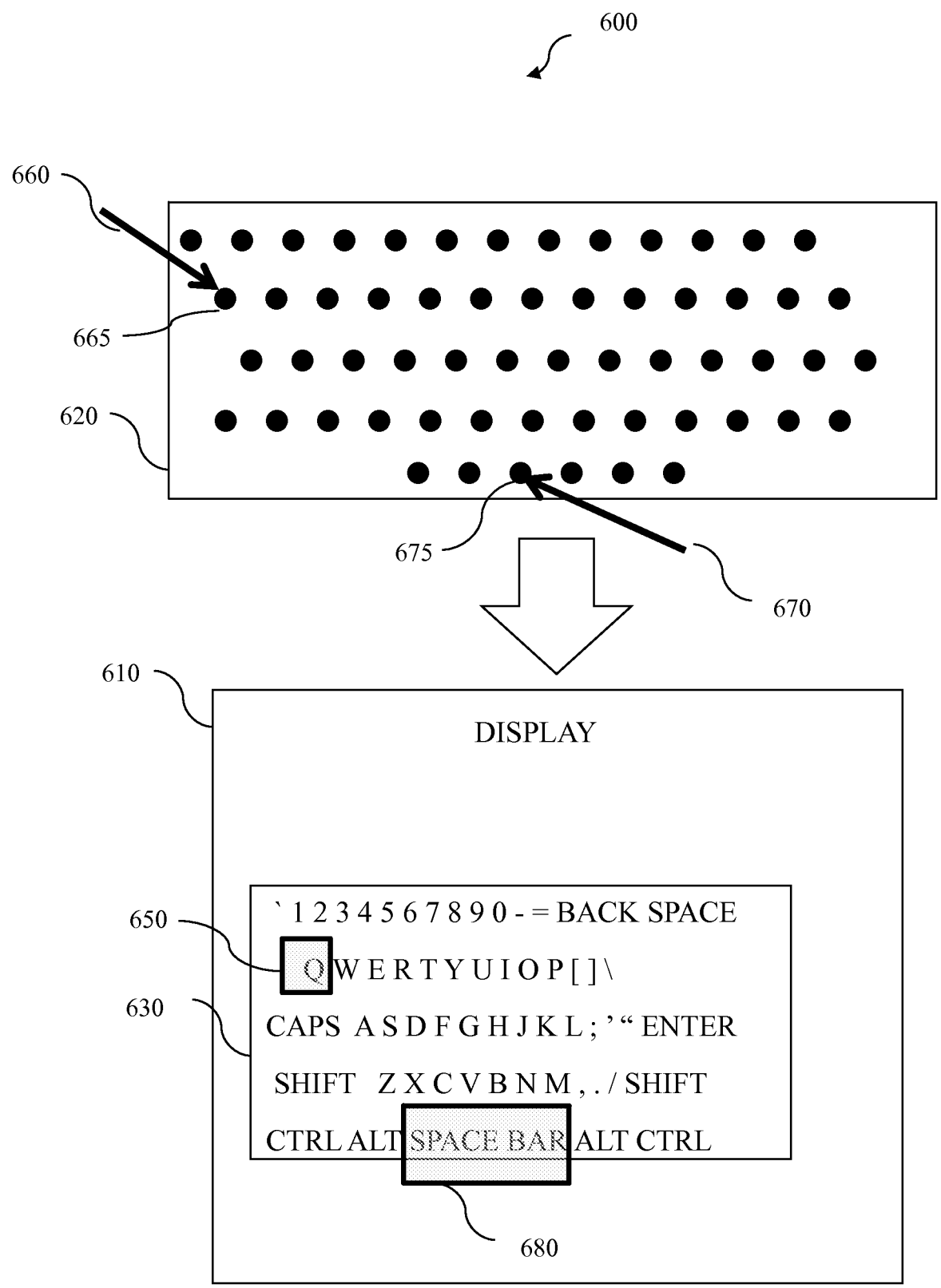
FIG. 6 depicts the user tactile input device programmed as a QWERTY keyboard in accordance with certain embodiments.

In certain embodiments shown in FIG. 6, the user tactile input device 620 with a user input entry point 665 may be mapped to any key on the virtual keyboard 630 by mapping software. For example, the pointing device 660 when depressing user input entry point 665 may make the letter Q appear or the pointing device 660 may depress user input entry point 675 and may make the letter Q appear. It is also possible for another pointing device 670 when depressing a user input entry point 675 may make the letter Q or a space appear in a Prompt Line 540 depending on the mapping software. The mapping software may be modified to change the mapping from the particular user input entry point to a virtual keyboard 630 key. The mapping software also may allow the letter Q 650 and the SPACE BAR 680 on the virtual keyboard 630 to both be highlighted when a pointing device 660 hovers over the user input entry point 665 and pointing device 670 hovers over the user input entry point 675 simultaneously. This programmability allows the user tactile input device 620 to be mapped to any virtual keyboard such as a different language or any special keypad configuration.

Figure 7:
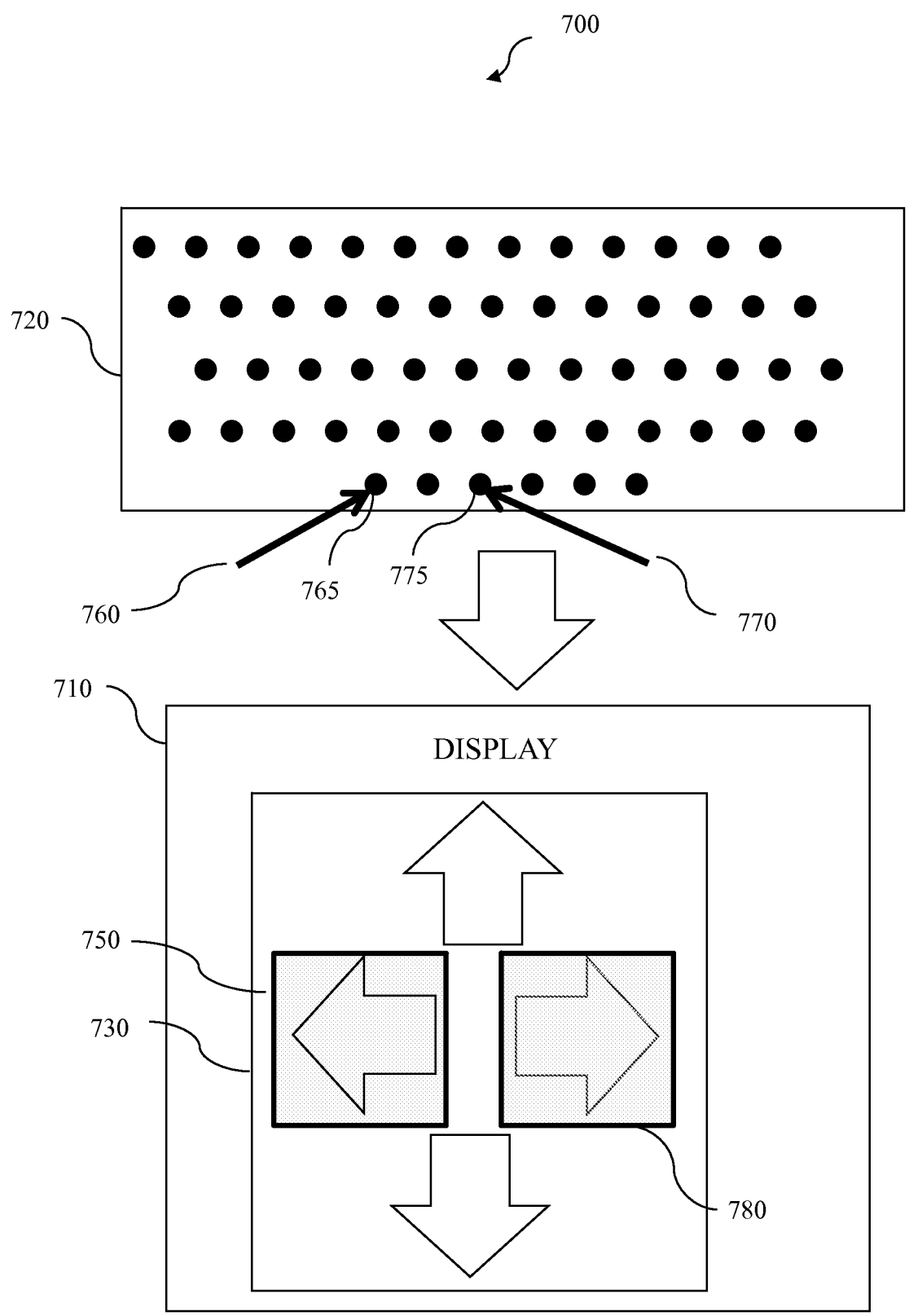
FIG. 7 depicts the user tactile input device programmed as a virtual game controller in accordance with certain embodiments.

In certain embodiments, FIG. 7 depicts one particular mapping of the user tactile input device. The user tactile input device 720 may be mapped to a virtual game controller 730 shown on the display 710. As such, when user input entry point 765 is hovered over by a pointing device 760 the virtual game controller 730 may appear on the screen semi-transparently over any application windows and the left arrow key 750 of the virtual game controller may be highlighted on the display 710. If the pointing device 760 depresses the user input entry point 765 the left arrow key may generate a left action within an application window such as within a game application. It is also possible for another pointing device 770 or the same one 760, such as another finger to hover over another user input entry point such as user entry point 775. This may cause the virtual game controller 730 to appear on the screen and the right arrow key 780 of the virtual game controller may be highlighted on the display 710. If the pointing device 770 depresses the user input entry point 775 the right arrow key may generate a right action within an application window such as a game application. It is also possible for any pointing device such as 770 when depressing user input entry point, such as 775 to be mapped to any other key such as the left arrow key 750 or to the right arrow key 780. The programmability of the mapping software may allow any user input entry point such as 775 of the user tactile input device 720 to be mapped to any key on the virtual game controller 730.

Figure 8:
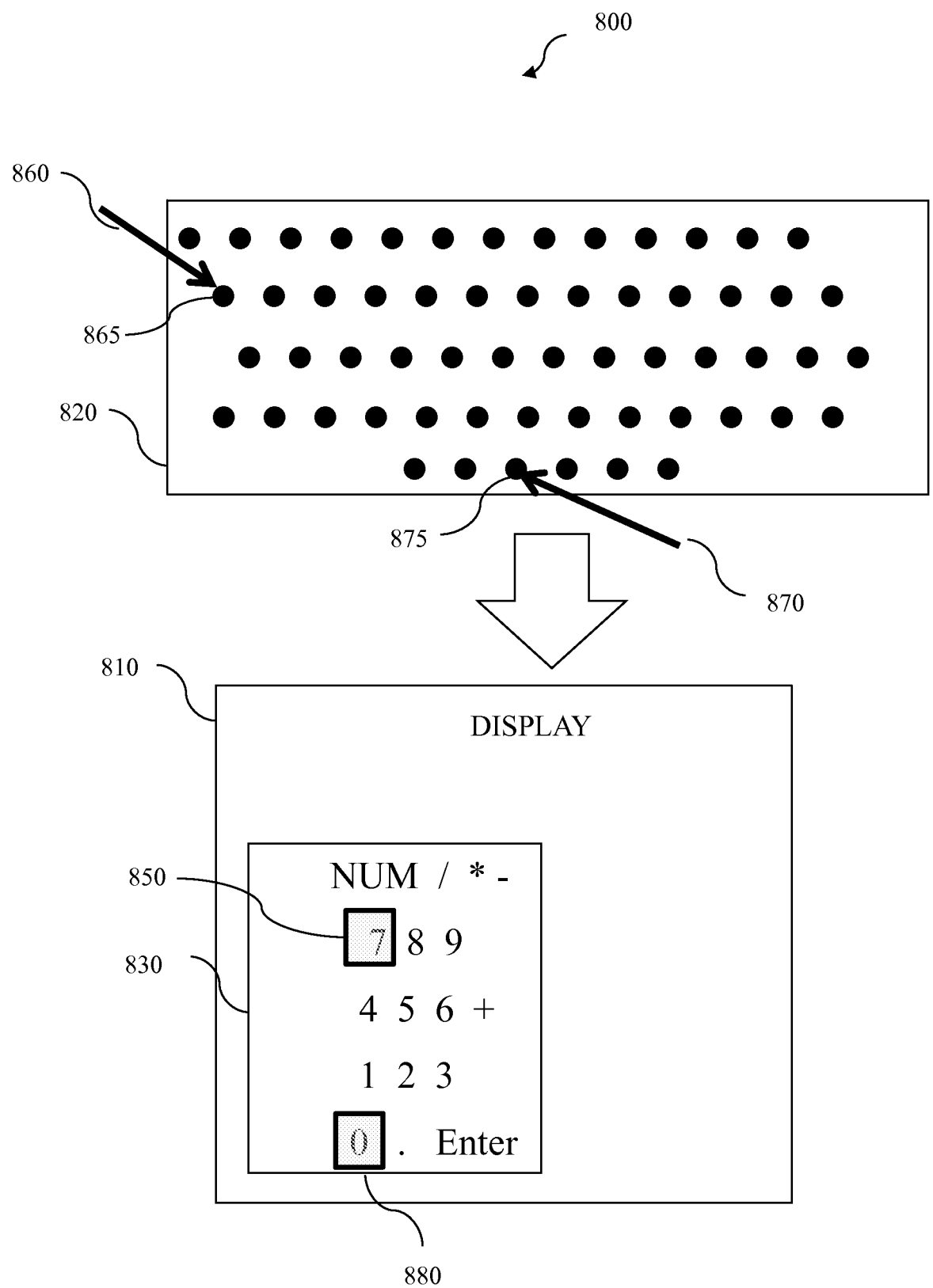
FIG. 8 depicts the user tactile input device programmed as a virtual number input pad in accordance with certain embodiments.

In certain embodiments, FIG. 8 depicts another particular mapping of the user tactile input device. The user tactile input device 820 may be mapped to a virtual number entry pad 830 shown on the display 810. As such when user input entry point 865 is hovered over by a pointing device 860, the virtual number entry pad 830 may appear on the screen and the number 7 key 850 of the virtual number entry pad may be highlighted on the display 810. If the pointing device 860 depresses the user input entry point 865 the number 7 (on virtual number entry pad 830) may be displayed in the particular prompt line 475 within an application window or elsewhere on the display. It is also possible for another pointing device 870, such as another finger, or the same one 860, to hover over another user input entry point such as user entry point 875. This may cause the virtual number entry pad 830 to appear on the screen and the number 0 key 880 of the virtual number entry pad may be highlighted on the display 810. If the pointing device 870 depresses the user input entry point 875 the number 0 may be displayed in the particular prompt line 475 within an application window or elsewhere on the display. It is also possible for any pointing device such as 870 when depressing user input entry point, such as 875 to be mapped to any other key such as the 7 key 850 or the 0 key 880. This programmability of the mapping software may allow any user input entry point such as 875 of the user tactile input device 820 to be mapped to any key on the virtual number entry pad 830. Therefore, it is understood that the invention is not to be limited to the specific embodiments disclosed, and that modifications and embodiments are intended to be included as readily appreciated by those skilled in the art.

Figure 9:
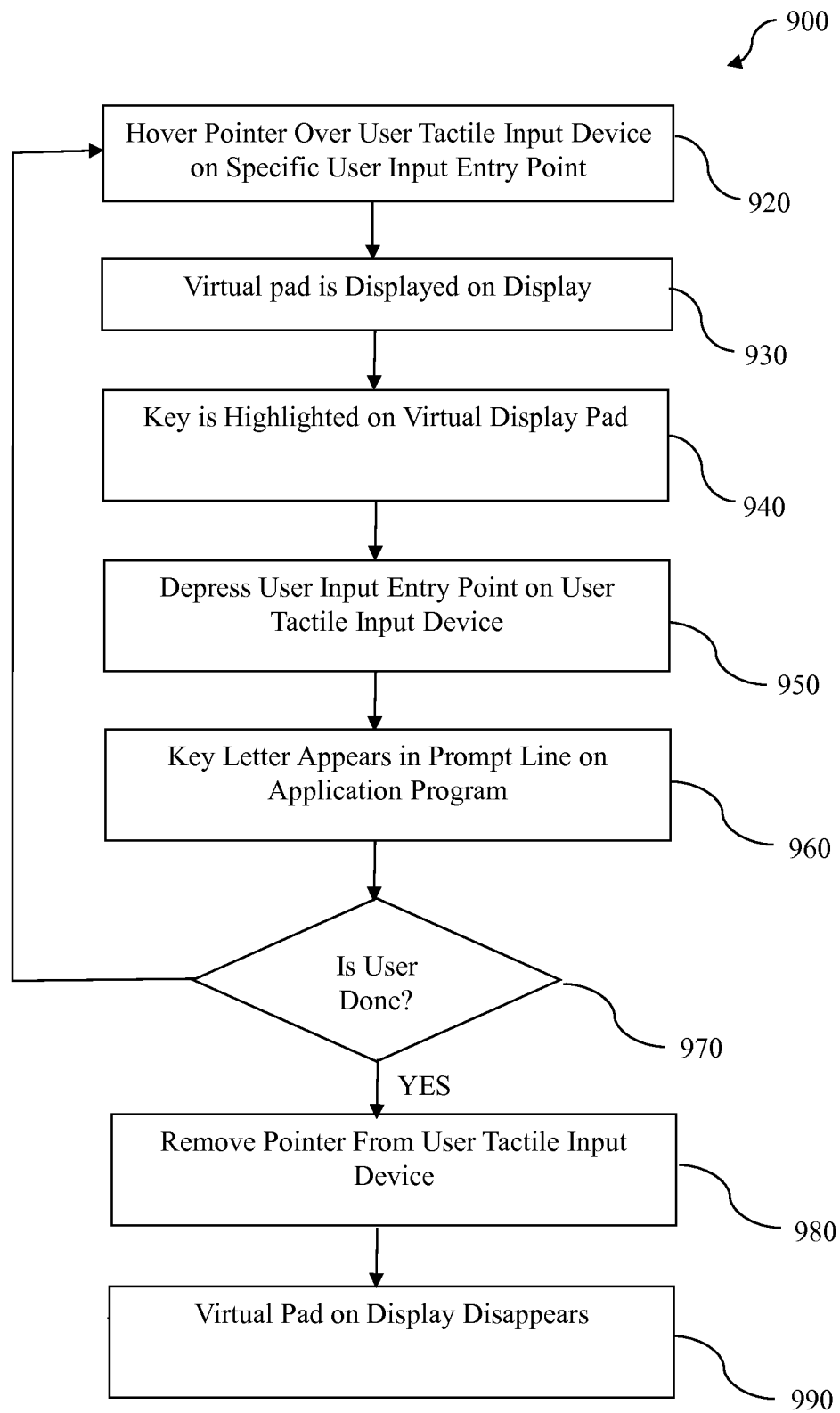
FIG. 9 depicts a flow chart of the operation of a variable user tactile input device with display feedback in accordance with certain embodiments.

In certain embodiments, FIG. 9 depicts a flow chart showing a method 900 of using a user tactile input device input device to enter information into a system using a virtual pad such as a virtual keyboard as feedback. The method begins by hovering a pointer over a user tactile input device on a specific user input entry point which represents a key input (920). This may generate a virtual pad such as a virtual keyboard, virtual game controller or virtual number pad, on the display (930). This virtual keyboard may be a semi-transparent representation of the user tactile input device and may be overlaid on the display monitor. As the pointer, for example a finger or a stylus, is hovered over a particular key, a key is highlighted on the virtual display pad (940). Hovering may be any contact with the user tactile input device with a pointing device such as a finger or a stylus. In certain embodiments, hovering may include placing a pointing device such as a finger or a stylus in proximity to but not in actual contact with the user tactile input device and sensing the proximity of pointing device. If the pointing device is no longer hovered over one of the user input entry points, the representation of the user tactile input device may disappear from the display monitor. Multiple pointers may be used such as multiple fingers to hover over multiple user input entry points. If this occurs, then multiple keys on the virtual keyboard may be highlighted at the same time. If a user depresses the user input entry point, for example, a contact bump, on the user tactile input device with a pointing device (950), a particular corresponding letter or other symbol may appear in the prompt line on the application program or elsewhere on the display (960). This may e.g., cause the letter Q 550 to appear in the prompt line 540. It may also be possible to depress multiple keys for multiple key combinations at the same time such as SHIFT A to produce the capital letter A. Therefore, it is understood that the invention is not to be limited to the specific embodiments disclosed, and that modifications and embodiments are intended to be included as readily appreciated by those skilled in the art. After a symbol has been displayed in the prompt line in the display after the user input entry point, such as a bump, has been depressed, it may be that there are no more characters or activity that need to be entered into the display. The user thus may be done typing (970). If this is the case, then the pointer may be removed from the user tactile input device (980) and the transparent virtual pad, for example, a virtual keyboard, virtual game controller or virtual number pad, on the display may disappear (990). It may be programmed so that the display disappears after a certain length of inactivity. For example, after ten seconds of inactivity, where inactivity may be no hovering with a pointing device over the user tactile input device for the last 10 seconds, the display may disappear. If there are characters or activity that may need to be entered into the display, then the user may hover a pointer over the user tactile input device on another specific key 920 and start the process over again and enter the next key.

Figure 10:
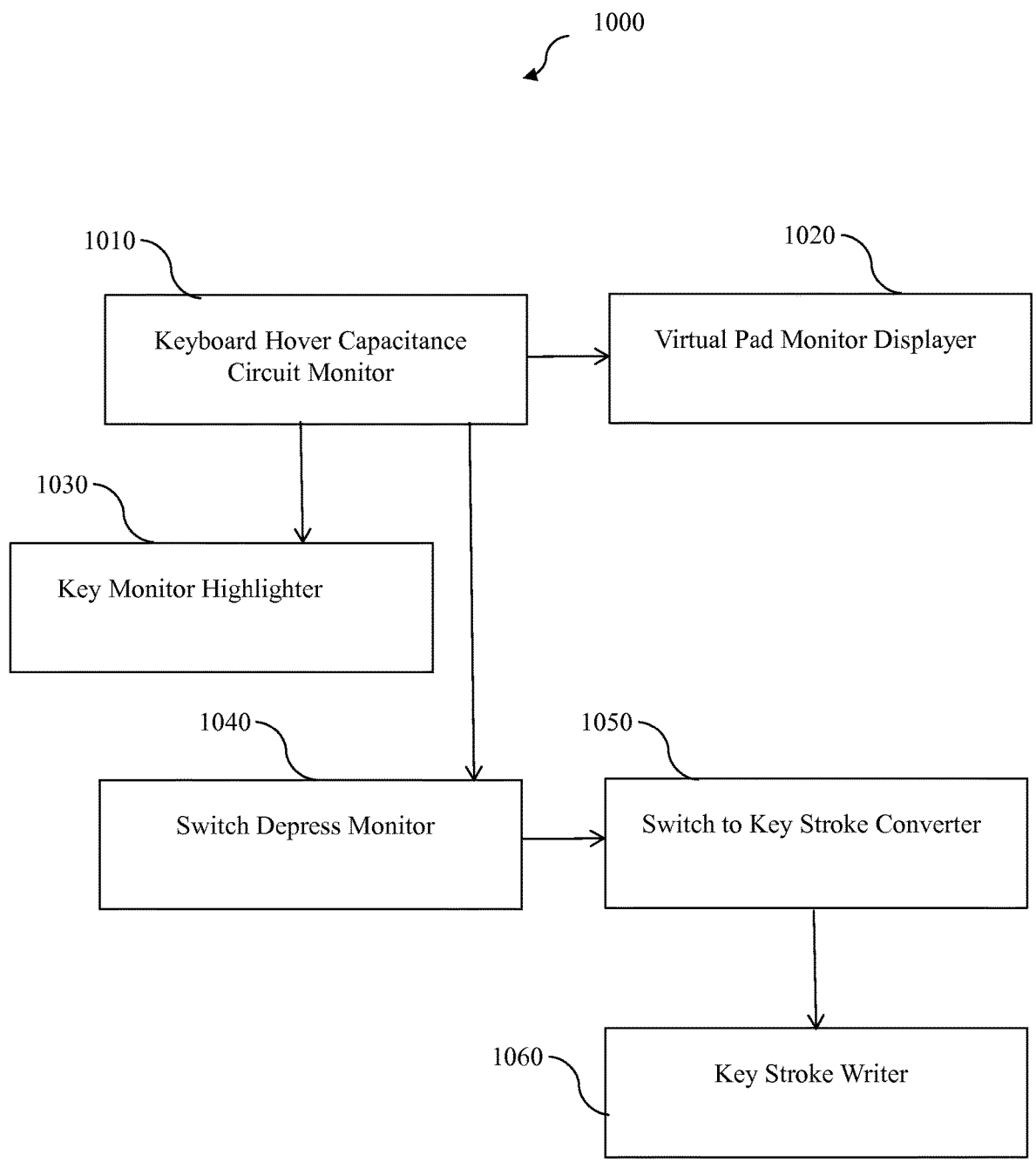
FIG. 10 depicts a block diagram of the system operation of a variable user tactile input device with display feedback in accordance with certain embodiments.

In certain embodiments, FIG. 10 depicts a block diagram of using a user tactile input device to enter keys into a system 1000 using a virtual pad such as a keyboard as feedback. The system 1000 may include a keyboard Hover Capacitance Circuit Monitor 1010 for monitoring capacitance changes and generating control signals corresponding thereto when a user's pointer, such as a finger or a stylus, may hover over a particular user input entry point of the user tactile input device. The virtual pad software may sense the changes in capacitance and the one or more signals representing the capacitive changes may be transmitted to Virtual Pad Monitor Displayer 1020, which may generate an appearance of the virtual pad such as a virtual keyboard, virtual number pad or virtual game controller, for being overlaid on a display. If a particular user input entry point is hovered over (thus changing the capacitance of the user input entry point), then the Key Monitor Highlighter 1030 may highlight a particular key on the virtual pad on the display. There may be more than one pointer hovering over more than one key on the user tactile input device. This may cause Key Monitor Highlighter 1030 to highlight more than one key simultaneously on the virtual pad on the display. The Switch Depress Monitor 1040 may be connected to the output of the Keyboard Hover Capacitance Circuit Monitor 1010 whereas the output of the Switch Depress Monitor 1040 may be connected to the input of the Switch to Key Stroke Converter 1050. The Switch Depress Monitor 1040 may monitor which user input entry point has been depressed by a pointer such as a finger or a stylus and may pass this information to the Switch to Key Stroke Converter 1050. The Switch to Key Stroke Converter 1050 may translate this information to which symbol may be written into the prompt line of the application window on the display by the Key Stroke Writer 1060. If multiple user entry inputs are depressed simultaneously such as SHIFT A, then the Switch to Key Stroke Converter 1050 may decipher this multiple user entry input and inform the Key Stroke Writer 1060 to write a capital A into the prompt line of the application window on the display.

Figure 11:
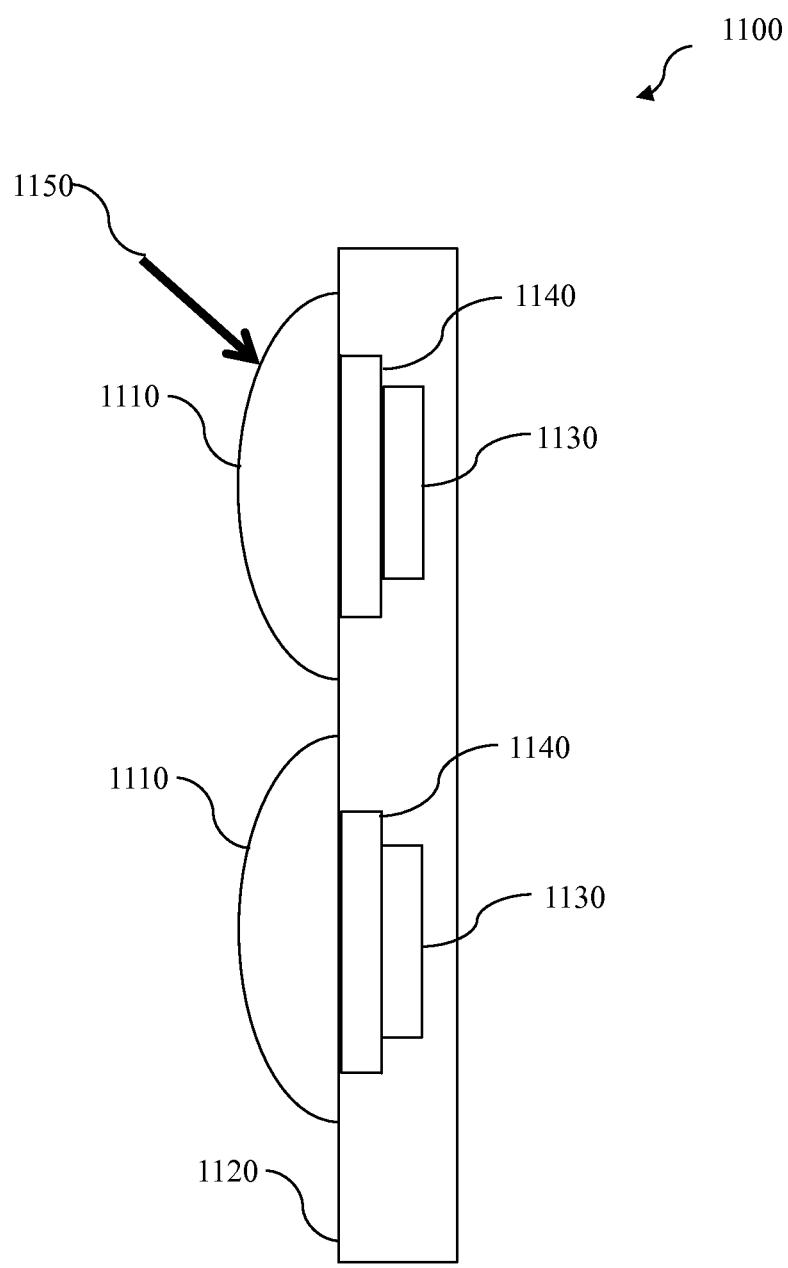
FIG. 11 depicts the side view of the stack up of the contact bumps, capacitive sensors and the switches that may be used in this invention in accordance with certain embodiments.

FIG. 11 may be a side view of a stack up of the user input entry points 1110 with contact bumps, connected to capacitive sensors 1140 to sense capacitive changes by the pointers hovering over the user entry points 1110. The capacitive sensors 1140 may then be connected to switches 1130, for example, mechanical or electrical switches, that may be depressed when the pointer 1150 presses down on the user entry input 1110 to connect the switch. In certain embodiments, the user entry input 1110 may have a bump that is raised above the surface 1120. In certain embodiments, the user entry input 1110 may be flat with the surface or a combination of flat and raised bumps may be used for the user input entry points. The surface may be a printed circuit card (PCB), ribbon cable, electrical substrate, etc. The capacitance sensor and the switch may also be connected to a computer or display system that may use both of these inputs to generate a virtual pad, highlight a particular key on the virtual pad and write a symbol in a prompt line within an application on the display. Therefore, it is understood that the level of complexity of this invention is not to be limited to the specific embodiments disclosed, and that modifications and embodiments are intended to be included as readily appreciated by those skilled in the art.

Many modifications and other embodiments of the invention will come to mind of one skilled in the art having the benefit of the teachings presented in the forgoing descriptions and the associated drawings. Therefore, it is understood that the invention is not to be limited to the specific embodiments disclosed, and that modifications and embodiments are intended to be included as readily appreciated by those skilled in the art.

While the above description contains many specifics and certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art, as mentioned above. The invention includes any combination or sub-combination of the elements from the different species and/or embodiments disclosed herein.

We claim:

1. An input system with display feedback to guide a user to keys that the user may want to select comprising:
    a display comprising a semi-transparent virtual pad overlaid on the display; and
    at least one user input entry point coupled to the display for highlighting a key on the semi-transparent virtual pad when the at least one user input entry point is hovered over by a pointer,
    wherein the semi-transparent virtual pad remains on the display for a period of time after the pointer is no longer hovering over the at least one user input entry point, and
    wherein the semi-transparent virtual pad disappears from the display after the period of time lapses without detecting the pointer hovering over the at least one user input entry point.

2. The input system of claim 1, wherein the display further comprises an application window prompt line and wherein a symbol is displayed in the application window prompt line in response to the at least one user input entry point being depressed by the pointer.

3. The input system of claim 1, wherein the at least one user input entry point is a bump contact that is raised from a surface.

4. The input system of claim 1, wherein the at least one user input entry point is flat with a surface.

5. The input system of claim 1, wherein the at least one user input entry point comprises at least one row and one column of user input entry points.

6. The input system of claim 1, wherein the key on the semi-transparent virtual pad is mapped one-to-one to the at least one user input entry point.

7. The input system of claim 1, wherein the semi-transparent virtual pad is a virtual keyboard.

8. The input system of claim 1, wherein the semi-transparent virtual pad is a virtual game controller.

9. The input system of claim 1, wherein the semi-transparent virtual pad is a virtual number pad.

10. The input system of claim 1, wherein the at least one user input entry point is not visible to the user when viewing the display.

11. The input system of claim 10, wherein the display is a heads-up display and the at least one user input entry point is physically separate from the heads-up display.

12. The input system of claim 1, wherein the at least one user input entry point is configured to stop highlighting the key on the semi-transparent virtual pad in response to the at least one user input entry point being no longer hovered over by the pointer.

13. The input system of claim 1, wherein the at least one user input entry point is configured to stop highlighting the key on the semi-transparent virtual pad after a programmed time of inactivity of hovering of the pointer over the at least one user input entry point.

14. The input system of claim 1, further comprising memory storing programmable mapping software that specifies a first mapping of keys on the semi-transparent virtual pad to user input entry points of a first input device having a first keypad configuration, wherein the programmable mapping software is configured to be modified to specify a second mapping for a second input device having a second keypad configuration that is different than the first keypad configuration.

15. The input system of claim 1, wherein the pointer is a first pointer, the at least one user input entry point is a first user input entry point, and the key is a first key, and wherein the input system further comprises:
    a second user input entry point coupled to the display for highlighting a second key on the semi-transparent virtual pad when the second user input entry point is hovered over by a second pointer, wherein the first key and the second key are both highlighted when the first user input entry point and the second user input entry point are simultaneously hovered over by the first pointer and the second pointer, respectfully.

16. A method of providing display feedback for an input device to guide a user to keys that the user may want to select comprising:

presenting a semi-transparent virtual pad on a display;

detecting that a pointer is hovering over at least one user input entry point of the input device;

highlighting a key on the semi-transparent virtual pad in response to detecting that the pointer is hovering over the at least one user input entry point;

detecting that the at least one user input entry point is depressed by the pointer as a depressed user input entry point;

generating an action within a game application based at least in part on the depressed user input entry point; and detecting that the pointer is no longer hovering over the at least one user input entry point, wherein the semi-transparent virtual pad remains on the display for a period of time after the pointer is no longer hovering over the at least one user input entry point, and wherein the semi-transparent virtual pad disappears from the display after the period of time lapses without detecting the pointer hovering over the at least one user input entry point.

17. The method of claim 16, wherein the at least one user input entry point is a bump contact that is raised from a surface.

18. The method of claim 16, wherein the at least one user input entry point is flat with a surface.

19. The method of claim 16, wherein the at least one user input entry point comprises at least one row and one column of user input entry points.

20. The method of claim 16, wherein the key on the semi-transparent virtual pad is mapped one-to-one to the at least one user input entry point.

21. The method of claim 16, wherein the semi-transparent virtual pad is a virtual keyboard.

22. The method of claim 16, wherein the semi-transparent virtual pad is a virtual game controller.

23. The method of claim 16, wherein the semi-transparent virtual pad is a virtual number pad.

24. The method of claim 16, further comprising modifying programmable mapping software that specifies a first mapping for the input device having a first keypad configuration to generate modified mapping software that specifies a second mapping for a second input device having a second keypad configuration that is different than the first keypad configuration.

25. An input system with display feedback to guide a user to keys that the user may want to select comprising:

a keyboard hover capacitance circuit monitor for monitoring capacitance changes and generating one or more corresponding control signals representing the capacitance changes when a pointer hovers over a user input entry point of an input device, the user input entry point comprising a capacitive sensor and a switch;

a virtual pad monitor displayer for generating a semi-transparent virtual pad on a display in response to receiving the one or more corresponding control signals;

a key monitor highlighter for highlighting a symbol on the semi-transparent virtual pad in response to receiving the one or more corresponding control signals, which indicate that the pointer is hovering over the user input entry point;

a switch depress monitor for detecting when the user input entry point is depressed by the pointer as a depressed user input entry point;

a switch to key stroke converter coupled to the switch depress monitor for translating the depressed user input entry point to the symbol; and a key stroke writer coupled to the switch to key stroke converter for writing the symbol to a prompt line of an application window on the display, wherein the semi-transparent virtual pad remains on the display for a period of time after the keyboard hover capacitance circuit monitor detects that the pointer is no longer hovering over the user input entry point, and wherein the semi-transparent virtual pad disappears from the display after the period of time lapses without the keyboard hover capacitance circuit monitor detecting the pointer hovering over the user input entry point.

26. The input system of claim 25, further comprising memory storing programmable mapping software that specifies a first mapping of keys on the semi-transparent virtual pad to user input entry points of the input device having a first keypad configuration, wherein the programmable mapping software is configured to be modified to specify a second mapping for a second input device having a second keypad configuration that is different than the first keypad configuration.

27. A method for providing display feedback for an input device to guide a user to keys that the user may want to select comprising:

detecting when a pointer hovers over a user input entry point of the input device;

generating a semi-transparent virtual pad on a display in response to detecting when the pointer hovers over the user input entry point;

highlighting a symbol on the semi-transparent virtual pad in response to detecting when the pointer hovers over the user input entry point;

detecting when the user input entry point is depressed by the pointer as a depressed user input entry point;

translating the depressed user input entry point to the symbol;

writing the symbol to a prompt line of an application window on the display; and detecting that the pointer is no longer hovering over the user input entry point, wherein the semi-transparent virtual pad remains on the display for a period of time after the pointer is no longer hovering over the user input entry point, and wherein the semi-transparent virtual pad disappears from the display after the period of time lapses without detecting the pointer hovering over the user input entry point.

28. The method of claim 27, wherein the pointer is a first pointer, the user input entry point is a first user input entry point, and the symbol is a first symbol, the method further comprising:

detecting when a second pointer hovers over a second user input entry point; and highlighting a second symbol on the semi-transparent virtual pad in response to detecting when the second pointer hovers over the second user input entry point, wherein the first symbol and the second symbol are both highlighted when the first user input entry point and the second user input entry point are simultaneously hovered over by the first pointer and the second pointer, respectfully.

\* \* \* \* \*